US012621125B2

(12) United States Patent
Choi et al.

(10) Patent No.: US 12,621,125 B2
(45) Date of Patent: May 5, 2026

(54) METHOD AND APPARATUS FOR PERFORMING DYNAMIC HASHING TO STORE KEY VALUES IN ORDER

(71) Applicant: UNIST (ULSAN NATIONAL INSTITUTE OF SCIENCE AND TECHNOLOGY), Ulsan (KR)

(72) Inventors: Young-ri Choi, Ulsan (KR); Jin Yang, Ulsan (KR); Hee Jin Yoon, Ulsan (KR); Gyeongchan Yun, Ulsan (KR); Sam H. Noh, Ulsan (KR)

(73) Assignee: UNIST (ULSAN NATIONAL INSTITUTE OF SCIENCE AND TECHNOLOGY), Ulsan (KR)

( * ) Notice: Subject to any disclaimer, the term of this patent is extended or adjusted under 35 U.S.C. 154(b) by 315 days.

(21) Appl. No.: 18/228,596

(22) Filed: Jul. 31, 2023

(65) Prior Publication Data

US 2024/0048358 A1 Feb. 8, 2024

(30) Foreign Application Priority Data

Aug. 4, 2022 (KR) ........................ 10-2022-0097515

(51) Int. Cl.
*H04L 9/06* (2006.01)
(52) U.S. Cl.
CPC .................................. *H04L 9/0643* (2013.01)

(58) Field of Classification Search
USPC ......................................................... 713/168
See application file for complete search history.

(56) References Cited

U.S. PATENT DOCUMENTS

| | | | | |
|---|---|---|---|---|
| 10,942,856 B2 * | 3/2021 | Sandberg | ............ | G06F 12/0811 |
| 2008/0177741 A1 * | 7/2008 | Joshi | ........................ | G06F 16/25 |
| 2014/0244598 A1 * | 8/2014 | Haustein | ............ | G06F 16/2365 |
| | | | | 707/692 |
| 2017/0161397 A1 * | 6/2017 | Choi | .................... | G06F 16/9014 |

FOREIGN PATENT DOCUMENTS

| | | | | | |
|---|---|---|---|---|---|
| CN | 114385636 A | * | 4/2022 | ............ | G06F 16/23 |
| JP | 2014130489 A | | 7/2014 | | |
| KR | 100599938 B1 | | 7/2006 | | |
| KR | 102388458 B1 | | 4/2022 | | |

* cited by examiner

*Primary Examiner* — Sanchit K Sarker
(74) *Attorney, Agent, or Firm* — MARSHALL, GERSTEIN & BORUN LLP; William J. Samore

(57) ABSTRACT

A dynamic hashing apparatus includes a processor configured to obtain a target segment based on at least a part of a key value of an insertion request, compute a hash value by applying a remapping function corresponding to the obtained target segment to an input value based on the key value, and update the remapping function by adjusting a slope of the remapping function in response to the key value not being insertable into a target bucket selected based on at least a part of the computed hash value from among buckets included by the target segment.

26 Claims, 7 Drawing Sheets

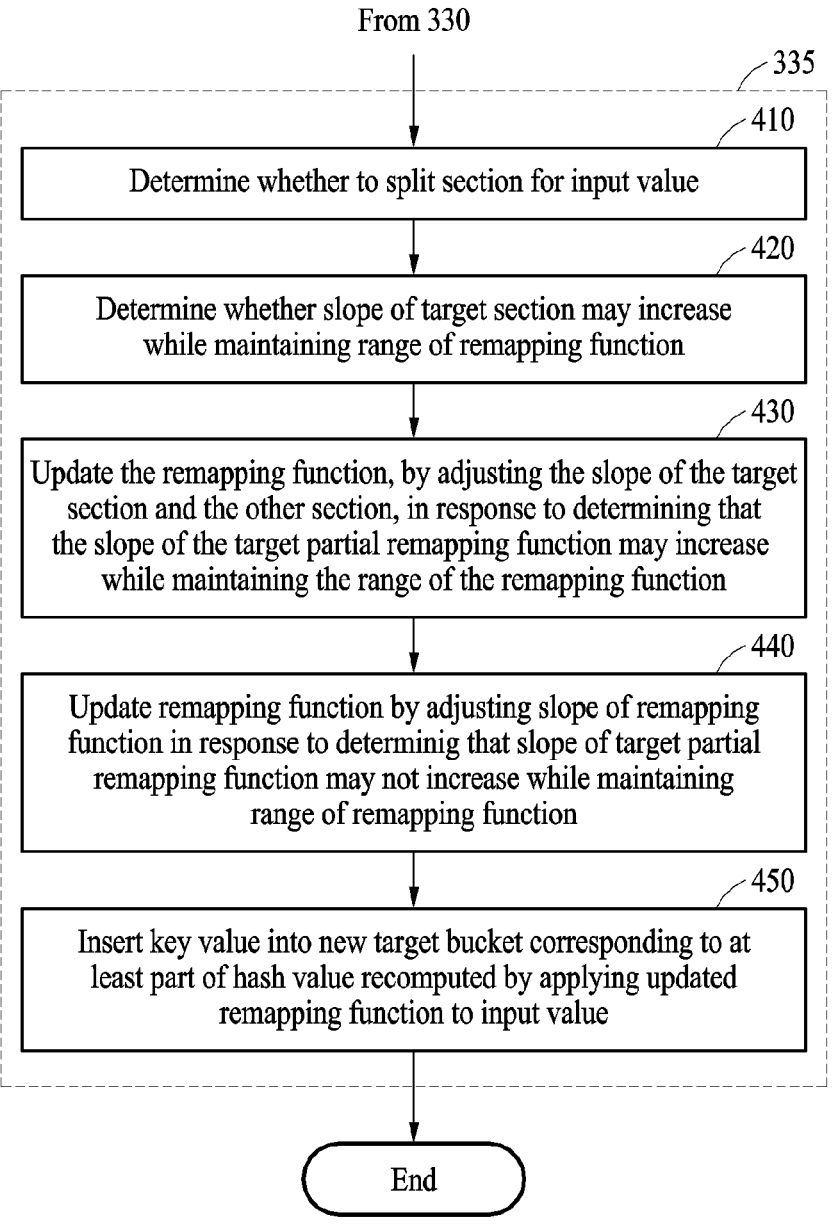

From 330

335

410

Determine whether to split section for input value

420

Determine whether slope of target section may increase
while maintaining range of remapping function

430

Update the remapping function, by adjusting the slope of the target
section and the other section, in response to determining that
the slope of the target partial remapping function may increase
while maintaining the range of the remapping function

440

Update remapping function by adjusting slope of remapping
function in response to determinig that slope of target partial
remapping function may not increase while maintaining
range of remapping function

450

Insert key value into new target bucket corresponding to at
least part of hash value recomputed by applying updated
remapping function to input value End

FIG. 4

METHOD AND APPARATUS FOR PERFORMING DYNAMIC HASHING TO STORE KEY VALUES IN ORDER

CROSS-REFERENCE TO RELATED APPLICATION(S)

This application claims the priority benefit of Korean Patent Application No. 10-2022-0097515 filed on Aug. 4, 2022, in the Korean Intellectual Property Office, the disclosure of which is incorporated herein by reference for all purposes.

BACKGROUND

1. Field

One or more embodiments relate to a dynamic hashing.

2. Description of Related Art

Recent studies indicate that a key distribution of an actual dataset is diverse and complex. In other words, keys may be more skewed in a certain section than other sections in a whole section, or a degree of concentration may greatly vary depending on the sections. A typical index structure, supposing a uniform key distribution, may not efficiently support the search, insertion, and scanning of a dynamic dataset.

Field research on indexing structure has recently proposed a learned index technique which approximates a cumulative distribution function (CDF) of a key distribution by using a machine learning algorithm, such as a neural network or a linear regression, and using the key distribution to create an index, unlike a typical B+ tree or hash table. This technique may outperform a typical indexing technique when a key distribution is uniform and does not greatly change over time. However, there may be the problem that the performance of an index significantly decreases because a CDF approximation is not readily available and becomes inaccurate with respect to a dynamic dataset, in which a key density changes over a whole key space, a key distribution changes over time, and an overhead to predict a CDF again dynamically according to a change increases.

SUMMARY

A dynamic hashing method according to an aspect may provide a high-performance index structure optimally supporting a dynamic dataset.

However, technical aspects are not limited to the foregoing aspects, and there may be other technical aspects.

According to an aspect, a dynamic hashing method performed by a processor includes obtaining a target segment based on at least a part of a key value of an insertion request; computing a hash value by applying a remapping function corresponding to the obtained target segment to an input value based on the key value; and updating the remapping function by adjusting a slope of the remapping function in response to the key value not being insertable into a target bucket selected based on at least a part of the computed hash value from among buckets included by the target segment.

The dynamic hashing method may further include inserting the key value into a new target bucket corresponding to at least a part of a hash value recomputed by applying the updated remapping function to the input value.

The dynamic hashing method may further include inserting the key value to the target bucket in response to the key value being insertable to the target bucket selected based on at least a part of the computed hash value.

The obtaining the target segment may include selecting a target hash table from among a plurality of hash tables based on a predetermined number of most significant bits of the key value represented by a plurality of bits; selecting a target directory from among all the directories of the target hash table based on at least a part of a median value of the key value excluding bits used to obtain the target hash table; and obtaining the target segment connected to the selected target directory.

The computing the hash value of the insertion request may include excluding one or more bits required to identify the target segment of the key value of the insertion request represented by a plurality of bits from obtaining the input value.

The computing the hash value of the insertion request may include computing a hash value by applying a partial remapping function determined based on at least one bit of the input value represented by a plurality of bits to the input value.

The updating the remapping function may include increasing a slope of a target partial remapping function corresponding to the target bucket such that the number of key values that is less than or equal to the predetermined number is stored in each of a plurality of buckets of the target segment.

The updating the remapping function may include increasing a slope of a target partial remapping function corresponding to the target bucket and decreasing the slope of another partial remapping function while maintaining a range of the remapping function.

The updating the remapping function may include increasing a slope of a partial remapping function of a target section including the input value of a plurality of sections obtained by splitting a reference section in response to a utilization of the reference section including the input value being less than or equal to a utilization threshold.

The dynamic hashing method may further include omitting the update of the remapping function in response to a utilization of the target segment being greater than or equal to a utilization threshold.

The dynamic hashing method may further include determining whether the target segment is connected to a plurality of directories in response to a utilization of the target segment being greater than or equal to a utilization threshold.

The determining whether the target segment is connected to the plurality of directories may include determining based on whether the number of bits used to identify the target segment is less than the number of bits used to identify all the directories of the key value represented by a plurality of bits.

The dynamic hashing method may further include changing the target segment to new segments in response to a utilization of the target segment being greater than or equal to a utilization threshold and the target segment being connected to a plurality of directories and connecting the plurality of directories having been connected to the target segment to at least one of the new segments.

The dynamic hashing method may further include setting a new remapping function corresponding to each of the new segments based on a remapping function corresponding to the target segment in response to connecting a plurality of directories having been connected to the target segment to at least one of the new segments.

The dynamic hashing method may further include determining whether the target segment is expandable based on the number of buckets included by the target segment in response to a utilization of the target segment being greater than or equal to a utilization threshold.

The dynamic hashing method may further include expanding the target segment by increasing a slope of the remapping function in response to the target segment being expandable and using the greater number of bits of a hash value represented by a plurality of bits than before the target segment is expanded, to select the target bucket from among buckets of the target segment.

According to another aspect, a dynamic hashing apparatus includes a processor configured to obtain a target segment based on at least a part of a key value of an insertion request, compute a hash value by applying a remapping function corresponding to the obtained target segment to an input value based on the key value, and update the remapping function by adjusting a slope of the remapping function in response to the key value not being insertable into a target bucket selected based on at least a part of the computed hash value from among buckets included by the target segment.

The processor may insert the key value into a new target bucket corresponding to at least a part of a hash value recomputed by applying the updated remapping function to the input value.

The processor may insert the key value to the target bucket in response to the key value being insertable to the target bucket selected based on at least a part of the computed hash value.

The processor may exclude one or more bits required to identify the target segment of the key value of the insertion request represented by a plurality of bits from obtaining the input value.

The processor may increase a slope of a target partial remapping function corresponding to the target bucket such that the number of key values that is less than or equal to the predetermined number is stored in each of a plurality of buckets of the target segment.

The processor may increase a slope of a target partial remapping function corresponding to the target bucket and decrease a slope of another partial remapping function while maintaining a range of the remapping function.

The processor may increase a slope of a partial remapping function of a target section including the input value of a plurality of sections obtained by splitting a reference section in response to a utilization of the reference section including the input value being less than or equal to a utilization threshold.

The processor may omit the update of the remapping function in response to a utilization of the target segment being greater than or equal to a utilization threshold.

The processor may determine whether the target segment is connected to a plurality of directories in response to a utilization of the target segment being greater than or equal to a utilization threshold.

The processor may set a new remapping function corresponding to each of the new segments based on a remapping function corresponding to the target segment in response to connecting a plurality of directories having been connected to the target segment to at least one of the new segments.

A high-performance index structure optimally supporting a dynamic dataset may be used through a dynamic hashing method according to an aspect.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the present disclosure will become apparent and more readily appreciated from the following description of example embodiments, taken in conjunction with the accompanying drawings of which:

FIG. 4 is a diagram illustrating an operation of updating a remapping function by the dynamic hashing apparatus according to an embodiment;

DETAILED DESCRIPTION

Figure 1:
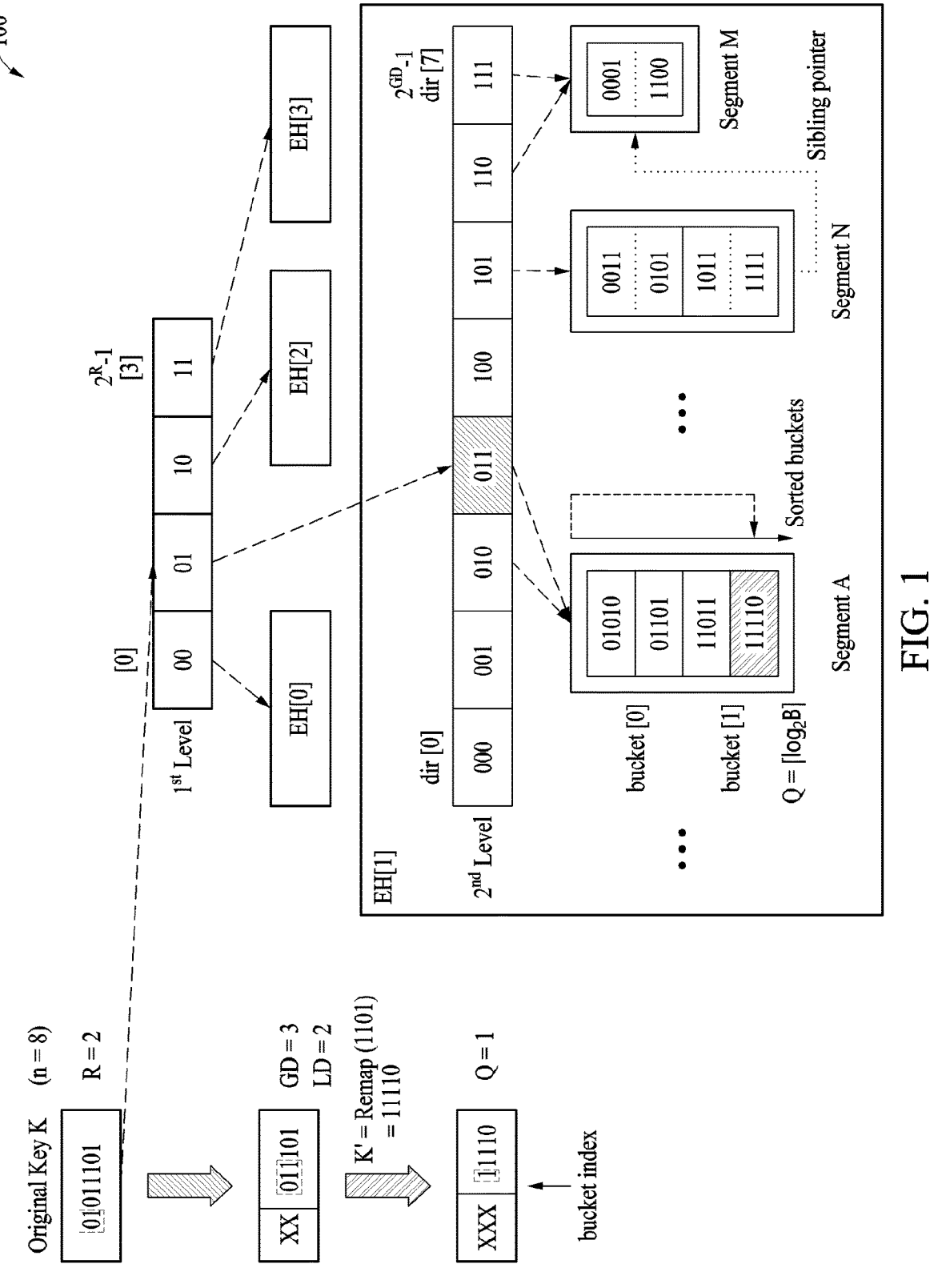
FIG. 1 is a diagram illustrating an operating method of a dynamic hashing apparatus according to an embodiment.

The following detailed structural or functional description is provided as an example only and various alterations and modifications may be made to the examples. Here, examples are not construed as limited to the disclosure and should be understood to include all changes, equivalents, and replacements within the idea and the technical scope of the disclosure.

Terms, such as first, second, and the like, may be used herein to describe various components. Each of these terminologies is not used to define an essence, order or sequence of a corresponding component but used merely to distinguish the corresponding component from other component(s). For example, a first component may be referred to as a second component, and similarly the second component may also be referred to as the first component.

It should be noted that if it is described that one component is "connected", "coupled", or "joined" to another component, a third component may be "connected", "coupled", and "joined" between the first and second components, although the first component may be directly connected, coupled, or joined to the second component.

The singular forms "a", "an", and "the" are intended to include the plural forms as well, unless the context clearly indicates otherwise. It will be further understood that the terms "comprises/including" and/or "includes/including" when used herein, specify the presence of stated features, integers, steps, operations, elements, and/or components, but do not preclude the presence or addition of one or more other features, integers, steps, operations, elements, components and/or groups thereof.

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art and are not to be interpreted in an idealized or overly formal sense unless expressly so defined herein.

Hereinafter, embodiments will be described in detail with reference to the accompanying drawings. When describing the embodiments with reference to the accompanying drawings, like reference numerals refer to like elements and a repeated description related thereto will be omitted.

FIG. 1 is a diagram illustrating an operating method of a dynamic hashing apparatus according to an embodiment.

Figure 2:
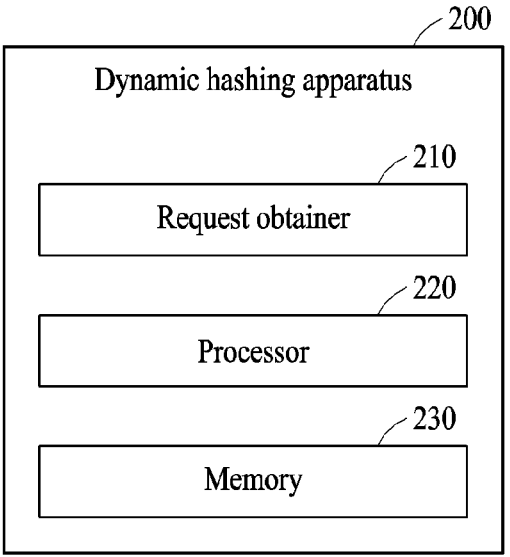
FIG. 2 is a block diagram illustrating the dynamic hashing apparatus according to an embodiment.

FIG. 2 is a block diagram illustrating the dynamic hashing apparatus according to an embodiment.

According to an embodiment, a dynamic hashing apparatus 200 may include a request obtainer 210, a processor 220, and a memory 230.

The request obtainer 210 may obtain an insertion request including a key value from an external device of the dynamic hashing apparatus 200. The insertion request may be a request to store the key value of the insertion request in the memory 230 of the dynamic hashing apparatus 200.

The processor 220 may determine where to store the key value of the insertion request in response to obtaining the insertion request through the request obtainer 210. Hereinafter, referring to FIG. 1, the example of the key value of the insertion request represented by 8 bits in a binary system is briefly described.

The processor 220 may determine a target hash table among a plurality of hash tables based on at least a part of the key value. For example, referring to FIG. 1, $01011101_{(2)}$, that is, a key value (represented by Original Key K in FIG. 1) represented by a plurality of bits, may determine a target hash table EH[1], based on 01, that is, the most significant bit of a predetermined number R (e.g., R=2 in FIG. 1) that is used to determine a hash table.

The processor 220 may determine a target directory among a plurality of directories of the target hash table based on at least a part of the key value. For example, the processor 220 may exclude a key value that is used to determine the target hash table of the key value represented by the plurality of bits from determining the target directory. For example, referring to FIG. 1, the processor 220 may use 011, that is, the most significant bit of the number GD (e.g., GD=3 in FIG. 1) of bits used to identify all the directories, in a remaining value $011101_{(2)}$ excluding bits used to determine a hash table from a key value $01011101_{(2)}$. The processor 220 may determine a target directory dir[011] based on 011, that is, at least a part of the key value. For reference, the number of bits used to determine the target directory (in other words, the number of bits used to identify all the directories) may be expressed as a global depth (GD).

The processor 220 may obtain a target segment connected to the target directory. As illustrated in FIG. 1, one segment may be assigned to one directory, or one segment may be assigned to a plurality of directories. For example, referring to FIG. 1, the processor 220 may determine a Segment A assigned to the target directory dir[011] to be the target segment. For reference, in the example illustrated in FIG. 1, because the target segment, Segment A, may be assigned to a plurality of directories dir[010] and dir[011], a third bit 0 of the key value and a fourth bit 1 of the key value may be used to identify the target segment. In other words, regardless of a fifth bit 1 of the key value, the target segment may be identified based on the third bit 0 and the fourth bit 1. Accordingly, independently of the number of bits used to identify all the directories being three, the number of bits used to identify the target segment may be two. The number of bits used to identify the target segment may be expressed as a local depth (LD).

The processor 220 may determine where to store the key value in the target segment. For example, the processor 220 may compute a hash value of the key value by applying a remapping function to an input value based on the key value. As described below, the remapping function may correspond to each segment, and a remapping function corresponding to one segment may be independent of another transform function corresponding to another segment. The processor 220 may determine a target bucket among a plurality of buckets of the target segment based on at least a part of the computed hash value. For example, the processor 220 may determine the target bucket based on the most significant bit of the number Q (e.g., Q=1 in FIG. 1) of bits used to identify all the buckets of a hash value represented by a plurality of bits. For example, referring to FIG. 1, the processor 220 may obtain $1101_{(2)}$ excluding bits used to determine the target hash table and identify the target segment from the key value $01011101_{(2)}$ as the input value. The processor 220 may obtain a hash value $1\ 1110_{(2)}$ by applying the remapping function (represented by Local Remap in FIG. 1) to the input value $1101_{(2)}$. The processor 220 may determine a target bucket, bucket[1], by using one most significant bit (e.g., 1 in FIG. 1) of the hash value represented by the plurality of bits.

The processor 220 may insert the key value into the target bucket while maintaining the sorting of the target bucket. Although the hash value $1\ 1110_{(2)}$ is illustrated as being stored in the target bucket bucket[1] in FIG. 1, this is a conceptual indication that a value corresponding to the insertion request is stored in the target bucket determined based on the hash value, and examples are not limited thereto. In other words, for example, key values of an insertion request may be inserted into the target bucket in an ascending order, and for another example, a hash value computed by using a remapping function may be inserted into the target bucket. Hereinafter, in the present disclosure, an example of inserting and/or storing the key values of the insertion request into and/or in the target bucket is mainly described. As described below, the dynamic hashing apparatus may store the key values in the target segment in an ascending order by using an increasing function as the remapping function. Accordingly, the dynamic hashing apparatus may effectively process a scan request. The scan request may be a request to return key values stored among key values included in a range greater than or equal to a first value and less than or equal to a second value. Since the dynamic hashing apparatus stores the key values in an ascending order, the scan request may be processed by sequentially returning the stored key values from a storage position of a key value having the first value until a key value exceeding the second value is found.

The memory 230 may store a plurality of hash tables. The memory 230 may further store data indicating the assignment between directories and segments, a remapping function corresponding to each segment, and/or key values. In addition, the memory 230 may temporarily and/or permanently store data and/or information required to perform a dynamic hashing method to determine a storage position of a key value of an insertion request.

Figure 3:
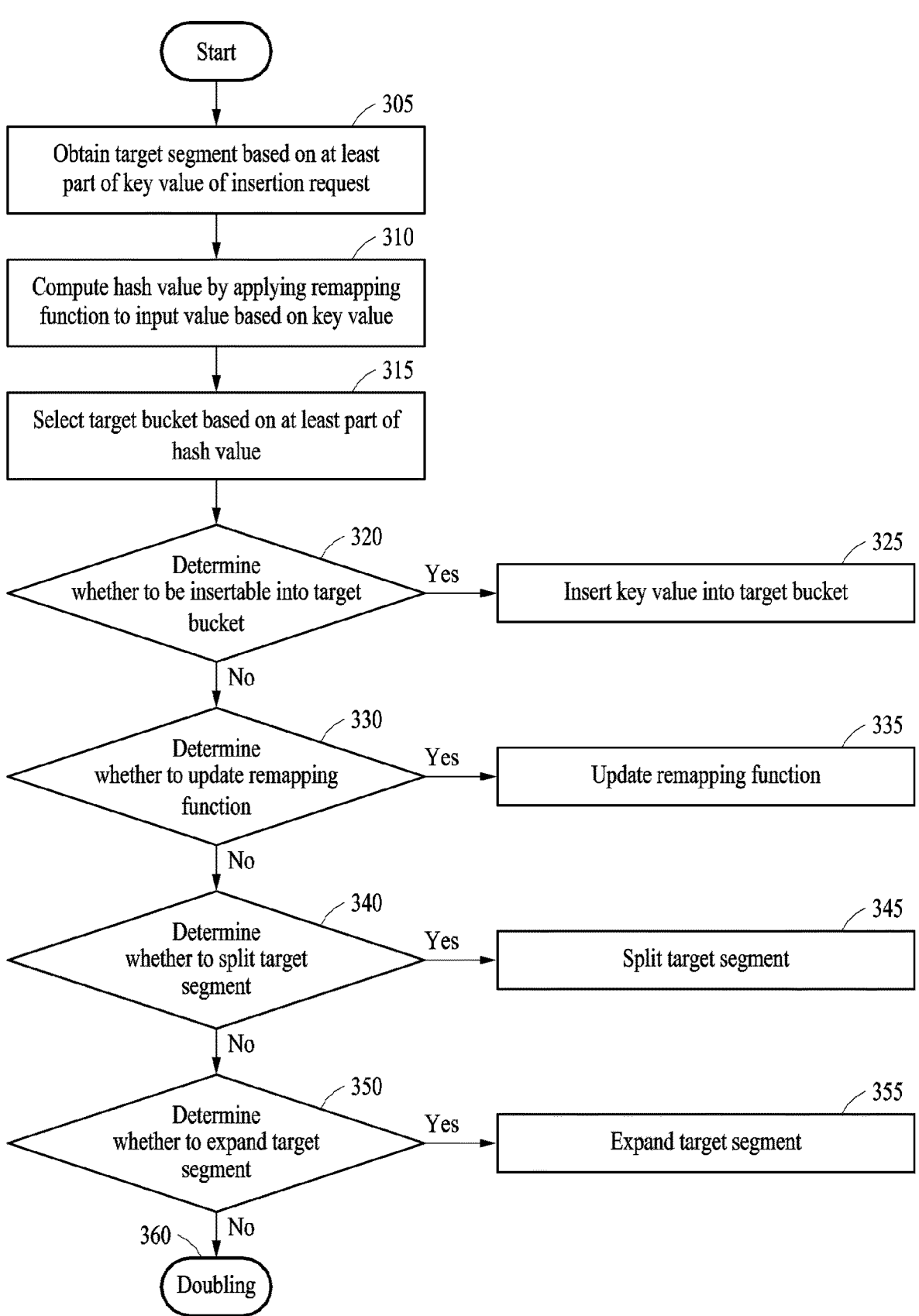
FIG. 3 is a diagram illustrating an operation of inserting a key value into a target bucket by the dynamic hashing apparatus according to an embodiment.

FIG. 3 is a diagram illustrating an operation of inserting a key value into a target bucket by the dynamic hashing apparatus according to an embodiment.

In operation 305, a processor may obtain a target segment based on at least a part of a key value of an insertion request.

Based on at least a part of the key value, the processor may select a target hash table from among a plurality of hash tables. For example, the processor may select the target hash table based on a predetermined number of most significant bits of the key value represented by a plurality of bits.

Then, the processor may select a target directory from among all the directories of the target hash table, based on at least a part of the key value. For example, the processor may obtain the median value of the key value represented by the plurality of bits excluding bits used to obtain the target hash table. The processor may select the target directory based on at least a part of the median value. At least a part of the median value may include most significant bits of the median value represented by a plurality of bits. The processor may select the target directory based on the most significant bits of the median value of the number of bits used to identify all the directories included by the target hash table. For example, when the target hash table includes 8 directories, three bits may be used to identify all the directories, and the processor may use the three most significant bits of the median value to select the target directory.

Then, the processor may obtain a target segment connected to the selected target directory.

In operation 310, the processor may compute a hash value by applying a remapping function to an input value based on the key value. The processor may use the remapping function corresponding to the target segment to compute the hash value.

According to an embodiment, the processor may obtain the input value based on at least a part of the key value. For example, the processor may exclude bits used to determine the target hash table and identify the target segment of the key value represented by the plurality of bits from obtaining the input value. In other words, the processor may obtain the input value for the remapping function by excluding the bits used to identify the target segment from the median value excluding the bits used to determine the target hash table from the key value in operation 305. For reference, the processor may store key values in an arranged order in a segment when one segment is connected to a plurality of directories by excluding the bits used to identify the target segment instead of excluding the bits used to identify all the directories from the median value.

Then, the processor may determine a partial remapping function to be applied to the input value among a plurality of partial remapping functions of the remapping function.

The partial remapping function may be a function corresponding to at least a part of the remapping function and may be a function sharing a slope in a section for consecutive input values. For example, the slope of the remapping function in a first section greater than or equal to $000_{(2)}$ and less than $010_{(2)}$ may be 1, the slope of the remapping function in a second section greater than or equal to $010_{(2)}$ and less than $100_{(2)}$ may be 2, the slope of the remapping function in a third section greater than or equal to $100_{(2)}$ and less than $110_{(2)}$ may be 1, and the slope of the remapping function in a fourth section greater than or equal to $110_{(2)}$ and less than $111_{(2)}$ may be 2. In this case, the remapping function may include a first partial remapping function corresponding to the first section, a second partial remapping function corresponding to the second section, a third partial remapping function corresponding to the third section, and a fourth partial remapping function corresponding to the fourth section.

For reference, the slope of the remapping function and/or the slope of a partial remapping function may be computed through a ratio of the length of a range to the length of a whole domain.

For example, the remapping function may have one partial remapping function. In other words, the remapping function may have the same slope in the whole domain. When the remapping function has one partial remapping function sharing a slope, the slope of the remapping function may be computed through a ratio of the length of a whole range to the length of the whole domain. For example, the domain of the remapping function may be greater than or equal to $000_{(2)}$ and less than or equal to $111_{(2)}$. The range of the remapping function may be greater than or equal to $00000_{(2)}$ and less than or equal to $11111_{(2)}$. The length of the whole domain of the remapping function may be computed as 8. The length of the range of the remapping function may be computed as 64. Accordingly, the slope of the remapping function may be computed through a ratio of 64 to 8, that is, computed as 8 by dividing 64 by 8.

For example, the remapping function may have four partial remapping functions. The remapping function may have the first partial remapping function corresponding to the first section, the second partial remapping function corresponding to the second section, the third partial remapping function corresponding to the third section, and the fourth partial remapping function corresponding to the fourth section. The domain of the remapping function may be greater than or equal to $000_{(2)}$ and less than or equal to $111_{(2)}$, the first section may be greater than or equal to $000_{(2)}$ and less than $010_{(2)}$, the second section may be greater than or equal to $010_{(2)}$ and less than $100_{(2)}$, the third section may be greater than or equal to $100_{(2)}$ and less than $110_{(2)}$, and the fourth section may be greater than or equal to $110_{(2)}$ and less than or equal to $111_{(2)}$.

The slope of the partial remapping function may be computed through a ratio of the length of a range corresponding to the partial remapping function to the length of the whole domain of the remapping function. Since the domain of the remapping function may be greater than or equal to $000_{(2)}$ and less than or equal to $111_{(2)}$, the whole length of the domain of the remapping function may be computed as 8. Likewise, the length of a range corresponding to the first partial remapping function may be computed as 8, the length of a range corresponding to the second partial remapping function may be computed as 16, the length of a range corresponding to the third partial remapping function may be computed as 8, and the length of a range corresponding to the fourth partial remapping function may be computed as 16. Accordingly, the slope of the first partial remapping function may be computed as 1, the slope of the second partial remapping function may be computed as 2, the slope of the third partial remapping function may be computed as 1, and the slope of the fourth partial remapping function may be computed as 2.

Each of partial remapping functions may be assigned to a section for the input value. Each section may be obtained by splitting a whole section including all input values, of which insertion is requested into the target segment. The processor may determine a section including an input value and a target partial remapping function corresponding to the section, based on at least one bit of the input value represented by a plurality of bits. The processor may determine a partial remapping function corresponding to the section including the input value to be the target partial remapping function to be applied to the input value.

As described below, the split of a section and the split of a partial remapping function may be performed in a process of updating a remapping function. For example, the processor may split one section into two sections when using the input value represented by the plurality of bits.

Then, the processor may compute a hash value by applying the determined partial remapping function to the input value.

In operation 315, the processor may select a target bucket based on at least a part of the computed hash value from among buckets included by the target segment. For example, the processor may select the target bucket by using the same number of most significant bits as the number of bits used to identify the buckets of the target segment of the hash value represented by a plurality of bits. A range of a hash value computed by applying a partial remapping function corresponding to a section to a value included by the section corresponding to the partial remapping function may correspond to one or more buckets.

In operation 320, the processor may determine whether a key value is insertable into the target bucket. Each bucket may also store a predetermined number (hereinafter expressed as a bucket capacity) of key values. For example, the bucket capacity may be 2, but the bucket capacity may not be limited to the example and may vary depending on a design. The processor may determine that a key value is not insertable when the number of key values corresponding to the bucket capacity is already stored in the target bucket. The processor may determine that a key value is insertable when the number of key values less than the number corresponding to the bucket capacity is stored in the target bucket.

In operation 325, the processor may insert a key value into the target bucket in response to the key value being insertable into the target bucket. The processor may store the key value in the target bucket regardless of the order of key values when there is no key value stored in the target bucket. On the other hand, when there is a key value stored in the target bucket, the processor may store a key value of an insertion request such that the stored key value and the key value of the insertion request are arranged in an ascending order.

In operation 330, the processor may determine whether to update the remapping function based on the utilization of the target segment. The utilization of the target segment may be computed through a ratio of the number of already stored key values to a maximum number of key values storable in the target segment. The maximum number of key values storable in the target segment may be computed by multiplying the number of buckets of the target segment by the bucket capacity.

The processor may omit the update of the remapping function in response to the utilization of the target segment being greater than or equal to a utilization threshold. When the target segment is greater than or equal to the utilization threshold, other buckets, besides the target bucket, have already stored many key values. Therefore, the processor may perform another operation (e.g., the split of a segment, the expansion of the segment, doubling, etc.) rather than adjusting the slope of the remapping function.

On the other hand, when the target segment is less than the utilization threshold, the capacity of the target bucket has already been full despite other buckets that may store an additional key value. Therefore, the processor may efficiently determine a storage position of a key value by adjusting the slope of the remapping function rather than performing the other operation (e.g., the split of a segment, the expansion of the segment, doubling, etc.).

In operation 335, the processor may update the remapping function corresponding to the target segment in response to a key value not being insertable into the target bucket. The processor may update the remapping function by adjusting the slope of the remapping function.

According to an embodiment, the processor may compute new hash values by applying the updated remapping function to input values based on key values already stored in the target segment in response to updating the remapping function. The processor may store a key value in a bucket determined to store the key value based on each of the new hash values.

The processor may recompute a hash value by applying the updated remapping function to an input value based on the key value of the insertion request. The processor may determine a new target bucket corresponding to at least a part of the recomputed hash value. The processor may insert a key value into the determined new target bucket.

The update operation of the remapping function is described below with reference to FIG. 4.

In operation 340, the processor may determine whether the target segment is connected to a plurality of directories in response to the utilization of the target segment being greater than or equal to the utilization threshold. As described above, one segment may be connected to one directory or to a plurality of directories. When the utilization of the target segment is greater than or equal to the utilization threshold, the processor may determine not to update the remapping function, and then, may determine whether the target segment may be split. The processor may determine that the target segment may be split in response to the target segment connected to the plurality of directories. The processor may determine that the target segment may not be split in response to the target segment connected to one directory. The operation of determining whether the target segment may be split is described below with reference to FIG. 6.

In operation 345, the processor may split the target segment into a plurality of new segments in response to determining that the target segment may be split. The processor may connect the plurality of directories having been connected to the target segment to the plurality of new segments. The processor may set a remapping function for each of the plurality of new segments based on the remapping function corresponding to the target segment.

Although not explicitly illustrated in FIG. 3, the processor may perform at least one of operations 305 to 360 as a process for a key value of another insertion request after splitting the target segment.

The split operation of the target segment is described below with reference to FIG. 6.

In operation 350, the processor may determine whether the target segment is expandable based on the number of buckets included by the target segment. The processor may determine that the target segment is expandable in response to the number of buckets of the target segment being less than or equal to half of a threshold bucket number. The processor may determine that the target segment is not expandable in response to the number of buckets of the target segment exceeding the half of the threshold bucket number.

According to an embodiment, the threshold bucket number may be determined based on the number of bits used to identify the target segment (or expressed as an LD of the target segment). For example, the threshold bucket number may be determined in proportion to the LD of the target segment.

Although the determining of whether the target segment is expandable is illustrated as being performed after determining whether the target segment may be split in FIG. 3, examples are not limited thereto. For example, the processor may determine whether the target segment is expandable in response to determining that the remapping function is not updated in operation 330. In other words, the processor may determine whether the target segment is expandable in response to the utilization of the target segment being greater than or equal to the utilization threshold.

The operation of determining whether the target segment is expandable is described below with reference to FIG. 7.

In operation 355, the processor may expand the target segment. The processor may increase the number of buckets included by the target segment. In addition, the processor may increase the slope of the remapping function corresponding to the target segment in the whole section. For example, the processor may double the slope of each of the plurality of partial remapping functions of the remapping function. Accordingly, the range of the remapping function may be doubled. Because the range corresponding to one bucket is fixed, the number of buckets of the target segment may be doubled.

Although not explicitly illustrated in FIG. 3, the processor may perform at least one of operations 305 to 360 as a process for a key value of another insertion request after expanding the target segment.

The expanding operation of the target segment is described below with reference to FIG. 7.

In operation 360, the processor may perform a doubling operation on all the directories of the target hash table. The processor may double the number of all the directories of the target hash table. Accordingly, the processor may need to use one additional bit to identify all the directories of the target hash table. In other words, the number of bits used to identify all the directories, or a GD, may increase by 1. The increased number of directories may be mapped to at least one segment. For example, the processor may connect a segment having been connected to an existing directory dir[01] to both directories dir[010] and dir[011] when the existing directory dir[01] corresponds to the two directories dir[010] and dir[011] after the doubling operation. Although not explicitly illustrated in FIG. 3, the processor may perform at least one of operations 305 to 360 as a process for a key value of another insertion request after the doubling operation.

FIG. 4 is a diagram illustrating an operation of updating a remapping function by the dynamic hashing apparatus according to an embodiment.

In operation 410, a processor may determine whether to split a section for an input value. The processor may determine to split a reference section in response to the utilization of the reference section being less than or equal to a utilization threshold. The processor may determine not to split the reference section in response to the utilization of the reference section exceeding the utilization threshold. For reference, the utilization threshold compared with the utilization of the reference section may be determined independently of the utilization threshold compared with the target segment described above with reference to FIG. 3.

The reference section may be a section including an input value and a section for an input value to which a target partial remapping function is applied among a plurality of partial remapping functions. By applying values included in the reference section to the target partial remapping function, the values may be used to compute a hash value for one bucket (e.g., a target bucket) or for a plurality of buckets (e.g., the target bucket and other buckets).

The utilization of the reference section may be computed through a ratio of the number of already stored key values to a maximum number of key values storable in the reference section. The maximum number of key values storable in the reference section may be computed by multiplying the number of buckets corresponding to the reference section by a bucket capacity. A bucket corresponding to the reference section may be a bucket in which computed hash values are stored by applying the remapping function to the values included in the reference section.

When the utilization of the reference section is less than or equal to the utilization threshold, the values included in the reference section may be used to compute the hash value for the plurality of buckets. In this case, a key value may not be inserted into the target bucket with the target bucket having already stored other key values, but the other buckets may still store key values. In other words, key values are concentrated only in a part related to the target bucket of the reference section, and a part related to another bucket of the reference section may have room for a key value. Therefore, it may be determined that there is no need to secure an additional bucket by increasing the slope of the part related to the other bucket. Accordingly, the processor may split the reference section into a plurality of sections. The plurality of split sections may be divided into a target section corresponding to a range of the target bucket and another section.

The processor may obtain the plurality of sections by splitting the reference section in response to determining to split the reference section. As described below, the processor may determine a section including an input value to be the target section among the obtained plurality of sections. The processor may determine the reference section to be the target section in response to determining not to split the reference section. The target section may be a section for an input value, that is, a target of operation of increasing the slope of a partial remapping function. In other words, the processor may increase the slope of the partial remapping function (also expressed as the 'target partial remapping function') of the target section. An example of not splitting the section for an input value is described below with reference to FIG. 5.

In operation 420, the processor may determine whether the slope of the target partial remapping function may increase while maintaining a range of the remapping function.

As described above, when a range of a partial remapping function increases, the number of buckets for storing hash values computed by applying the partial remapping function may also increase. On the other hand, when a range of a partial remapping function decreases, the number of buckets for storing hash values computed by applying the partial remapping function may also decrease. Accordingly, the maintaining a range of a remapping function corresponding to a target segment may be maintaining the number of buckets of the target segment.

To increase the slope of the target partial remapping function while maintaining the range of the remapping function, the slope of another partial remapping function may need to decrease. In other words, to increase the number of buckets corresponding to the target section while maintaining the number of buckets of the target segment, the number of buckets corresponding to another section may need to decrease.

According to an embodiment, based on the utilization of the other section, the processor may determine whether the slope of the target partial remapping function may increase while maintaining the range of the remapping function. The processor may determine the number of buckets additionally needed for the target section. For example, the processor may determine the additionally needed buckets to be 2 when two buckets correspond to the target section.

The processor may determine a section in which the utilization is less than or equal to the utilization threshold to be a section corresponding to the other partial remapping function even though decreasing the number of buckets corresponding to a section distinguished from the target section. The utilization threshold to be compared with the utilization of the section distinguished from the target section may be designed independently of the utilization threshold compared with the utilization of the target segment used to determine whether to update the remapping function and/or the utilization threshold compared with the utilization of the reference section used to determine whether to split the section for an input value.

The processor may determine that the slope of the target partial remapping function may increase while maintaining the range of the remapping function when the number of buckets corresponding to another section may decrease by the number of buckets additionally needed for the target section with the utilization of other sections being less than or equal to the utilization threshold. On the other hand, the processor may determine that the slope of the target partial remapping function may not increase while maintaining the range of the remapping function when the number of buckets corresponding to the other section may not decrease by the number of buckets additionally needed for the target section with the utilization of other sections being less than or equal to the utilization threshold.

The processor may increase the slope of the target partial remapping function corresponding to the target bucket such that the number of key values that is less than or equal to a predetermined number is stored in each of the plurality of buckets of the target segment. Hereinafter, the descriptions are provided in operations 430 and 440, which are operations respectively performed when the slope of the target partial remapping function may increase and may not increase while maintaining the range of the remapping function.

In operation 430, the processor may update the remapping function by adjusting the slope of the remapping function while maintaining the range of the remapping function in response to determining that the slope of the target partial remapping function may increase while maintaining the range of the remapping function. The processor may increase the slope of the target partial remapping function of the target section and may decrease the slope of another partial remapping function of another section. In other words, the processor may increase the number of buckets corresponding to the target section while maintaining the number of buckets of the target segment and may decrease the number of buckets corresponding to the other section.

An example of increasing the slope of the target partial remapping function while maintaining the range of the remapping function is described below with reference to FIG. 5.

In operation 440, the processor may update the remapping function by adjusting the slope of the remapping function in response to determining that the slope of the target partial remapping function may not increase while maintaining the range of the remapping function. The processor may increase the slope of the target partial remapping function of the target section. For reference, since the slope of the target partial remapping function increases, and the slope of the other partial remapping function is maintained, the number of buckets corresponding to the target section may increase without a decrease of the number of buckets corresponding to the other section. Accordingly, the total number of buckets of the target segment may increase. In other words, since the range according to the target partial remapping function increases, and the range according to the other partial remapping function does not change, the range of the whole remapping function may increase.

In operation 450, the processor may insert a key value into a new target bucket corresponding to at least a part of a hash value recomputed by applying the updated remapping function to an input value.

The processor may recompute the hash value by applying the updated remapping function to the input value based on the key value of an insertion request. The processor may determine a new target bucket corresponding to at least a part of the recomputed hash value. The processor may insert a key value into the determined new target bucket.

Figure 5:
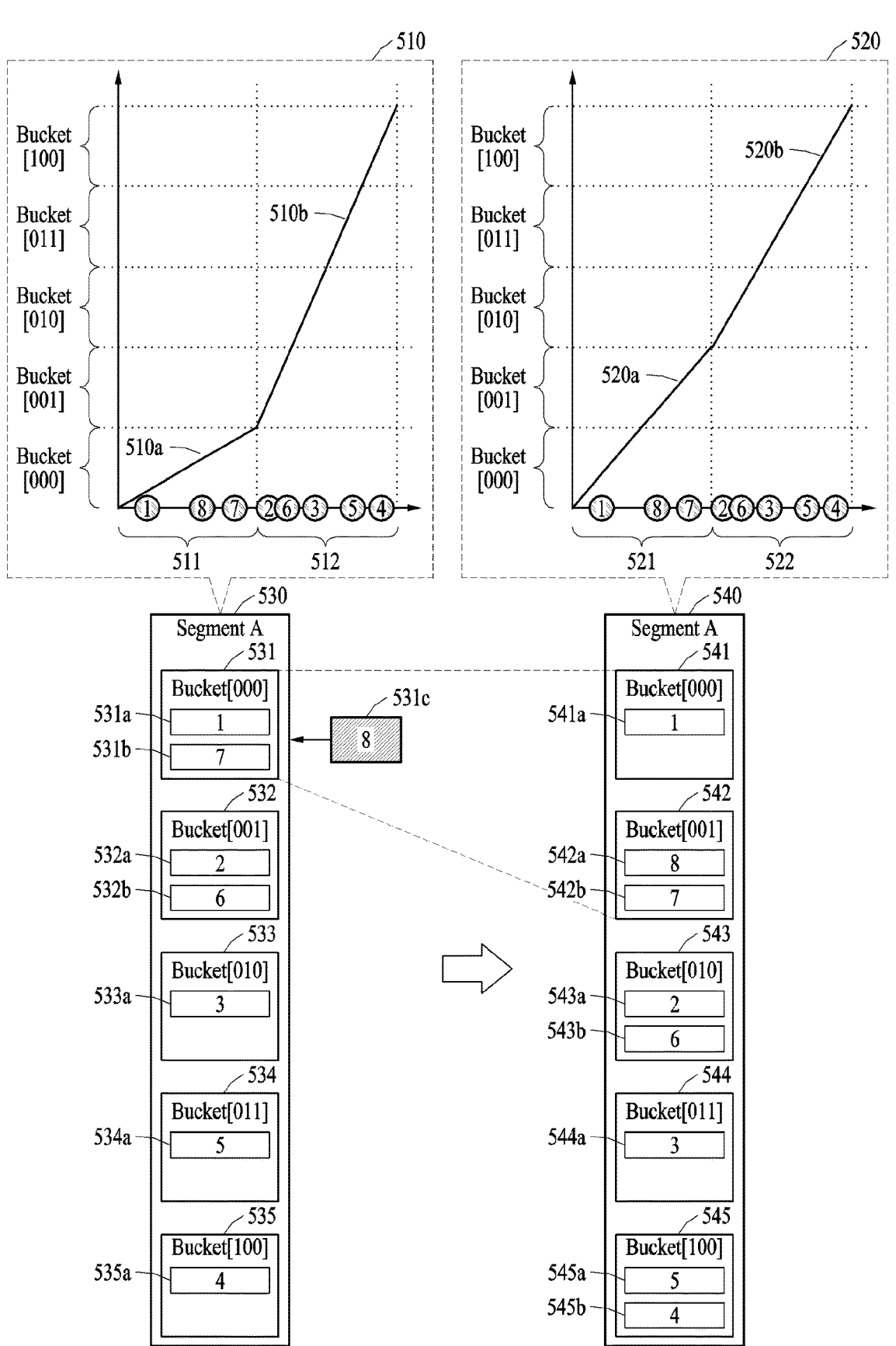
FIG. 5 is a diagram illustrating an example of an update operation of a remapping function performed by the dynamic hashing apparatus according to an embodiment.

FIG. 5 is a diagram illustrating an example of an update operation of a remapping function performed by the dynamic hashing apparatus according to an embodiment.

A target segment 530 (represented by Segment A in FIG. 5) may include 5 buckets 531, 532, 533, 534, and 535 (represented by Bucket[000], Bucket[001], Bucket[010], Bucket[011], and Bucket[100] in FIG. 5). In addition, the bucket 531 may store a first inserted key value 531*a* (represented by 1 in FIG. 5) and a seventh inserted key value 531*b* (represented by 7 in FIG. 5), the bucket 532 may store a second inserted key value 532*a* (represented by 2 in FIG. 5) and a sixth inserted key value 532*b* (represented by 6 in FIG. 5), the bucket 533 may store a third inserted key value 533*a* (represented by 3 in FIG. 5), the bucket 534 may store a fifth inserted key value 534*a* (represented by 5 in FIG. 5), and the bucket 535 may store a fourth inserted key value 535*a* (represented by 4 in FIG. 5). For example, each bucket may store a maximum of 2 key values. In other words, a bucket capacity may be 2. The numbers illustrated in input values 1, 2, 3, 4, 5, 6, 7, and 8 in the graphs of remapping functions 510 and 520 of FIG. 5 may be an order of being inserted into the target segment 530.

The remapping function 510 may correspond to the target segment 530. As described above, the remapping function 510 may be a function that computes a hash value by being applied to an input value.

Hereinafter, the additional insertion of the key value 531*c* into the target segment 530 may be an operation of updating a remapping function of the dynamic hashing apparatus.

The processor may obtain the target segment 530 based on at least a part of the key value 531*c* of an insertion request. The processor may compute a hash value by applying the remapping function 510 to an input value based on the key value 531*c* of the insertion request.

As illustrated in FIG. 5, for example, the processor may determine the bucket 531 (represented by Bucket[000] in FIG. 5) to be a target bucket based on three bits of the hash value represented by a plurality of bits. Because the target bucket 531 has already stored two key values 531*a* and 531*b*, the processor may determine that the key value 531*c* to be inserted eighthly is not insertable into the target bucket.

The processor may determine whether to update the remapping function based on the utilization of the target segment 530. Referring to FIG. 5, for example, the processor may compute the utilization of the target segment 530 as 0.70, which is a ratio of the number, that is, 7, of key values stored in the target segment 530 to a value, that is, 10, of multiplying 5 buckets by the bucket capacity, that is, 2. The processor may determine to update the remapping function in response to the utilization, that is, 0.70, of the target segment 530 being less than a utilization threshold, that is, 0.8.

Based on the utilization of a reference section, the processor may determine whether to split a section related to an input value of the remapping function. Referring to FIG. 5, for example, the processor may determine a section 511 including the input value based on the key value 531c to be the reference section. The processor may determine one bucket 531 (represented by Bucket[000] in FIG. 5) to be a bucket corresponding to the reference section 511. The processor may compute the utilization of the reference section as 1, which is a ratio of the number, that is, 2, of key values already stored in the bucket corresponding to the reference section to a value, that is, 2, of multiplying the number, that is, 1 of buckets corresponding to the reference section by the bucket capacity, that is, 2. The processor may determine not to split a reference section 521 in response to the utilization, that is, 1, of the reference section exceeding the utilization threshold, that is, 0.8.

The processor may determine whether the slope of the target section 511 may increase while maintaining a range of the remapping function 510. Referring to FIG. 5, for example, the processor may determine the number of buckets additionally needed for the target section to be 1 to double the number of buckets corresponding to the target section 511. The processor may determine whether the number of buckets assigned to another section may decrease while maintaining the utilization of the other section and the target section less than or equal to the utilization threshold. Referring to FIG. 5, for example, the number of buckets assigned to the other section 522 may be 4, and the number of key values stored in buckets corresponding to the other section 522 may be 5. When decreasing the number of buckets assigned to the other section 522 to 3, the processor may compute the utilization of the other section 522 as 0.83, which is a ratio of the number, that is, 5, of stored key values to a value, that is, 6, of multiplying the number, that is, 3, of buckets by the bucket capacity, that is, 2. When decreasing the number of buckets assigned to the other section to 3, the processor may determine that the slope of the target partial remapping function may increase while maintaining the range of the remapping function based on the utilization, that is, 0.83, of the other section being less than or equal to the utilization threshold, that is. 0.9. Accordingly, the processor may determine that the slope of the partial remapping function of the target section 522 may increase while maintaining the range of the remapping function 510.

The processor may update the remapping function by adjusting the slope of the remapping function while maintaining the range of the remapping function. Referring to FIG. 5, for example, the processor may update the remapping function 520 by increasing the slope of a target partial remapping function 510a of the target section 511 and decreasing the slope of another partial remapping function 510b of another section 512. Accordingly, the processor may increase the number of buckets corresponding to the target section 521 while maintaining the number of buckets of a target segment 540 and may decrease the number of buckets corresponding to the other section 522.

The processor may recompute a hash value by applying the updated remapping function 520 to the key value 531c. The processor may insert a key value 542a into a new target bucket 542 (represented by Bucket[001] in FIG. 5) determined based on the recomputed hash value. In addition, the processor may compute hash values recomputed by applying the updated remapping function 520 to input values based on the key values 531a, 531b, 532a, 532b, 533a, 534a, and 535a stored in the target segment 530. The processor may update the target segment 540 by inserting the key values 531a, 531b, 532a, 532b, 533a, 534a, and 535a into a target bucket determined based on each of the recomputed hash values. As described above, the processor may store the key values 542a and 542b stored in the target bucket 542 in an ascending order. Likewise, the processor may store key values included in each of other buckets 543 and 545 in an ascending order.

Figure 6:
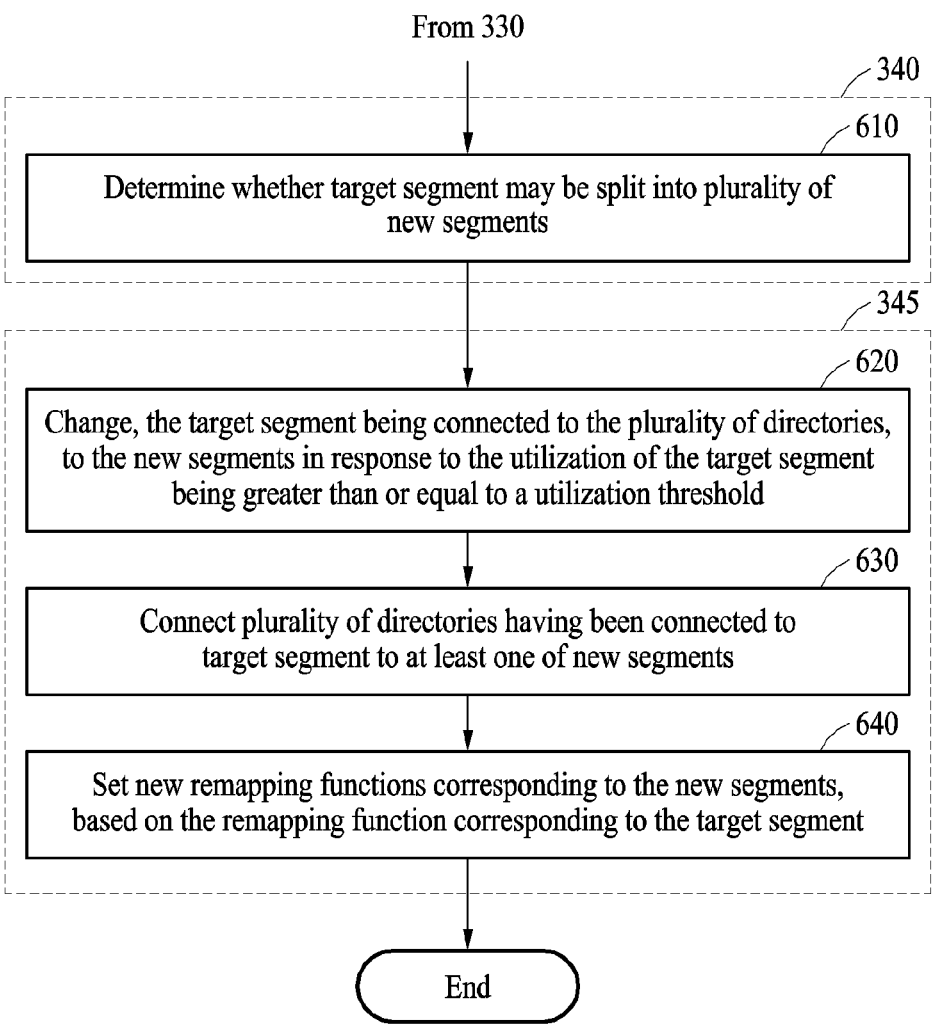
FIG. 6 is a diagram illustrating a split operation of a target segment performed by the dynamic hashing apparatus according to an embodiment.

FIG. 6 is a diagram illustrating a split operation of a target segment performed by the dynamic hashing apparatus according to an embodiment.

Hereinafter, the split operation of the target segment of the dynamic hashing apparatus according to an embodiment is described.

In operation 610, a processor may determine whether the target segment may be split into a plurality of new segments. The processor may determine whether the target segment may be split based on whether the target segment is connected to a plurality of directories. For example, the processor may have a determination based on whether the number of bits used to identify the target segment is less than the number of bits used to identify all the directories of a key value represented by a plurality of bits. For reference, the number of bits used to identify the target segment being less than the number of bits used to identify all the directories may indicate that the target segment is connected to the plurality of directories. On the other hand, the number of bits used to identify the target segment being the same as the number of bits used to identify all the directories may indicate that the target segment is connected to one directory.

For example, the processor may select a target directory dir[011] based on at least a part of a key value. The processor may obtain a target segment 940 connected to the target directory dir[011]. The processor may determine that the target segment may be split based on the target segment 940 being connected to the plurality of directories dir[010] and dir[011]. The processor may determine that the number of bits used to identify the target segment of the key value represented by a plurality of bits is 2. The processor may determine that the number of bits used to identify all the directories of the key value represented by the plurality of bits is 3. In response to the number of bits used to identify the target segment being less than the number of bits used to identify all the directories, the processor may determine that the target segment may be split.

In operation 620, the processor may split the target segment into a plurality of new segments in response to determining that the target segment may be split. For example, the processor may change the target segment to the new segments in response to the utilization of the target segment being greater than or equal to a utilization threshold and the target segment being connected to the plurality of directories. According to an embodiment, the processor may change the target segment into two new segments.

In operation 630, the processor may connect the plurality of directories having been connected to the target segment to at least one of the new segments. For example, the processor may connect the half of the directories having been connected to the target segment to one new segment, and the other half of the directories having been connected to the target segment to another new segment.

In operation 640, the processor may set new remapping functions in response to connecting the plurality of directories having been connected to the target segment to at least one of the new segments. A new remapping function may be a remapping function corresponding to each of the new segments based on the remapping function corresponding to the target segment.

Although not explicitly illustrated in FIG. 6, the processor may perform the insertion of a key value again as a process of the key value of another insertion request after splitting the target segment into the new segments.

Figure 7:
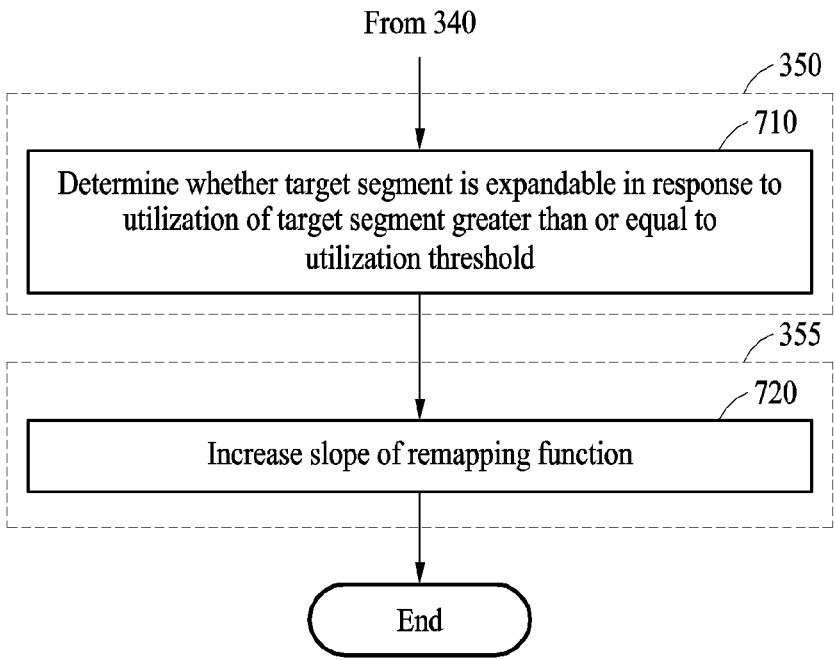
FIG. 7 is a diagram illustrating an expanding operation of a target segment by the dynamic hashing apparatus according to an embodiment.

FIG. 7 is a diagram illustrating an expanding operation of a target segment by the dynamic hashing apparatus according to an embodiment.

Hereinafter, the expanding operation of the target segment of the dynamic hashing apparatus according to an embodiment is described.

In operation 710, a processor may determine whether the target segment is expandable in response to the utilization of the target segment being greater than or equal to a utilization threshold. For example, the processor may determine whether the target segment is expandable by comparing the number of buckets included by the target segment with a threshold bucket number. The threshold bucket number may be determined based on the number of bits used to identify the target segment (or expressed as a 'local depth'). For example, the threshold bucket number may be determined by multiplying a predetermined number by the local depth.

In operation 720, the processor may expand the target segment by increasing the slope of a remapping function in response to the target segment being expandable. The processor may increase both the slope of a target partial remapping function of a target section and the slope of another partial remapping function. For example, the processor may expand the target segment by doubling the slope of the remapping function.

For reference, when performing an update operation of the remapping function by adjusting the slope of the remapping function, the processor may increase the slope of the target partial remapping function of the remapping function while maintaining the slope of the other partial remapping function or may increase the slope of the target partial remapping function while decreasing the slope of the other partial remapping function. On the other hand, the expanding operation of the target segment may include an increase of the slope of the whole remapping function, that is, an increase of the slope of the other partial remapping function, besides the slope of the target partial remapping function, when the remapping function includes a plurality of partial remapping functions.

Since the expanding operation of the target segment increases the number of buckets included by the target segment, the processor may need to use the increased number of bits to select a target bucket from among buckets. When expanding the target segment by doubling the slope of the remapping function and doubling the number of buckets included by the target segment, the processor may use one more bit to select the target bucket from among the buckets than before the target segment is expanded.

The examples described herein may be implemented by using a hardware component, a software component and/or a combination thereof. A processing device may be implemented using one or more general-purpose or special-purpose computers, such as, for example, a processor, a controller and an arithmetic logic unit (ALU), a digital signal processor (DSP), a microcomputer, a field-programmable gate array (FPGA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For the purpose of simplicity, the description of a processing device is used as singular; however, one skilled in the art will appreciate that a processing device may include multiple processing elements and multiple types of processing elements. For example, the processing device may include a plurality of processors, or a single processor and a single controller. In addition, different processing configurations are possible, such as parallel processors.

The software may include a computer program, a piece of code, an instruction, or some combination thereof, to independently or uniformly instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network-coupled computer systems so that the software is stored and executed in a distributed fashion. The software and data may be stored by one or more non-transitory computer-readable recording mediums.

The methods according to the above-described examples may be recorded in non-transitory computer-readable media including program instructions to implement various operations of the above-described examples. The media may also include, alone or in combination with the program instructions, data files, data structures, and the like. The program instructions recorded on the media may be those specially designed and constructed for the purposes of examples, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher-level code that may be executed by the computer using an interpreter.

The above-described devices may act as one or more software modules in order to perform the operations of the above-described examples, or vice versa.

As used herein, "A or B," "at least one of A and B," "at least one of A or B," "A, B or C," "at least one of A, B and C," and "at least one of A, B, or C," each of which may include any one of the items listed together in the corresponding one of the phrases, or all possible combinations thereof.

As described above, although the examples have been described with reference to the limited drawings, a person skilled in the art may apply various technical modifications and variations based thereon. For example, suitable results may be achieved if the described techniques are performed in a different order and/or if components in a described system, architecture, device, or circuit are combined in a different manner and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

The invention claimed is:

1. A dynamic hashing method performed by a processor, the dynamic hashing method comprising:

obtaining a target segment based on at least a part of a key value of an insertion request;

computing a hash value by applying a remapping function corresponding to the obtained target segment to an input value based on the key value; and updating the remapping function by adjusting a slope of the remapping function in response to the key value not being insertable into a target bucket selected based on at least a part of the computed hash value from among buckets comprised by the target segment, wherein the computing the hash value of the insertion request comprises:

computing a hash value by applying a partial remapping function determined based on at least one bit of the input value represented by a plurality of bits to the input value.

2. The dynamic hashing method of claim 1, further comprising:

inserting the key value into a new target bucket corresponding to at least a part of a hash value recomputed by applying the updated remapping function to the input value.

3. The dynamic hashing method of claim 1, further comprising:

inserting the key value to the target bucket in response to the key value being insertable to the target bucket selected based on at least a part of the computed hash value.

4. The dynamic hashing method of claim 1, wherein the obtaining the target segment comprises:

selecting a target hash table from among a plurality of hash tables based on a predetermined number of most significant bits of the key value represented by a plurality of bits;

selecting a target directory from among all the directories of the target hash table based on at least a part of a median value of the key value excluding bits used to obtain the target hash table; and obtaining the target segment connected to the selected target directory.

5. The dynamic hashing method of claim 1, wherein the computing the hash value of the insertion request comprises:

excluding one or more bits required to identify the target segment of the key value of the insertion request represented by a plurality of bits from obtaining the input value.

6. The dynamic hashing method of claim 1, wherein the updating the remapping function comprises:

increasing a slope of a target partial remapping function corresponding to the target bucket such that the number of key values that is less than or equal to a predetermined number is stored in each of a plurality of buckets of the target segment.

7. The dynamic hashing method of claim 1, wherein the updating the remapping function comprises:

increasing a slope of a target partial remapping function corresponding to the target bucket and decreasing a slope of another partial remapping function while maintaining a range of the remapping function.

8. The dynamic hashing method of claim 1, wherein the updating the remapping function comprises:

increasing a slope of a partial remapping function of a target section comprising the input value of a plurality of sections obtained by splitting a reference section in response to a utilization of the reference section comprising the input value being less than or equal to a utilization threshold.

9. The dynamic hashing method of claim 1, further comprising:

omitting the update of the remapping function in response to a utilization of the target segment being greater than or equal to a utilization threshold.

10. The dynamic hashing method of claim 1, further comprising:

determining whether the target segment is connected to a plurality of directories in response to a utilization of the target segment being greater than or equal to a utilization threshold.

11. The dynamic hashing method of claim 10, wherein the determining whether the target segment is connected to the plurality of directories comprises:

determining based on whether the number of bits used to identify the target segment is less than the number of bits used to identify all the directories of the key value represented by a plurality of bits.

12. The dynamic hashing method of claim 1, further comprising:

changing the target segment to new segments in response to a utilization of the target segment being greater than or equal to a utilization threshold and the target segment being connected to a plurality of directories; and connecting the plurality of directories having been connected to the target segment to at least one of the new segments.

13. The dynamic hashing method of claim 1, further comprising:

setting a new remapping function corresponding to each of the new segments based on a remapping function corresponding to the target segment in response to connecting a plurality of directories having been connected to the target segment to at least one of the new segments.

14. The dynamic hashing method of claim 1, further comprising:

determining whether the target segment is expandable based on the number of buckets comprised by the target segment in response to a utilization of the target segment being greater than or equal to a utilization threshold.

15. The dynamic hashing method of claim 1, further comprising:

expanding the target segment by increasing a slope of the remapping function in response to the target segment being expandable; and using the greater number of bits of a hash value represented by a plurality of bits than before the target segment is expanded, to select the target bucket from among buckets of the target segment.

16. A non-transitory computer-readable storage medium storing instructions that, when executed by a processor, cause the processor to perform a method comprising:

obtaining a target segment based on at least a part of a key value of an insertion request;

computing a hash value by applying a remapping function corresponding to the obtained target segment to an input value based on the key value; and

21 updating the remapping function by adjusting a slope of the remapping function in response to the key value not being insertable into a target bucket selected based on at least a part of the computed hash value from among buckets comprised by the target segment, wherein the computing the hash value of the insertion request comprises:

computing a hash value by applying a partial remapping function determined based on at least one bit of the input value represented by a plurality of bits to the input value.

17. A dynamic hashing apparatus comprising:

a hardware processor configured to obtain a target segment based on at least a part of a key value of an insertion request, compute a hash value by applying a remapping function corresponding to the obtained target segment to an input value based on the key value, and update the remapping function by adjusting a slope of the remapping function in response to the key value not being insertable into a target bucket selected based on at least a part of the computed hash value from among buckets comprised by the target segment, wherein the hardware processor is further configured to compute a hash value by applying a partial remapping function determined based on at least one bit of the input value represented by a plurality of bits to the input value.

18. The dynamic hashing apparatus of claim 17, wherein:

the hardware processor is further configured to insert the key value into a new target bucket corresponding to at least a part of a hash value recomputed by applying the updated remapping function to the input value.

19. The dynamic hashing apparatus of claim 17, wherein:

the hardware processor is further configured to insert the key value to the target bucket in response to the key value being insertable to the target bucket selected based on at least a part of the computed hash value.

20. The dynamic hashing apparatus of claim 17, wherein;

the hardware processor is further configured to exclude one or more bits required to identify the target segment of the key value of the insertion request represented by a plurality of bits from obtaining the input value.

21. The dynamic hashing apparatus of claim 17, wherein;

the hardware processor is further configured to increase a slope of a target partial remapping function corresponding to the target bucket such that the number of key values that is less than or equal to a predetermined number is stored in each of a plurality of buckets of the target segment.

22. The dynamic hashing apparatus of claim 17, wherein;

the hardware processor is further configured to increase a slope of a target partial remapping function corresponding to the target bucket and decreasing a slope of another partial remapping function while maintaining a range of the remapping function.

23. The dynamic hashing apparatus of claim 17, wherein:

the hardware processor is further configured to increase a slope of a partial remapping function of a target section comprising the input value of a plurality of sections obtained by splitting a reference section in response to a utilization of the reference section comprising the input value being less than or equal to a utilization threshold.

24. The dynamic hashing apparatus of claim 17, wherein;

the hardware processor is further configured to omit the update of the remapping function in response to a utilization of the target segment being greater than or equal to a utilization threshold.

25. The dynamic hashing apparatus of claim 17, wherein:

the hardware processor is further configured to determine whether the target segment is connected to a plurality of directories in response to a utilization of the target segment being greater than or equal to a utilization threshold.

26. The dynamic hashing apparatus of claim 17, wherein;

the hardware processor is further configured to set a new remapping function corresponding to each of the new segments based on a remapping function corresponding to the target segment in response to connecting a plurality of directories having been connected to the target segment to at least one of the new segments.

* * * * *